UNITED STATES PATENT OFFICE.

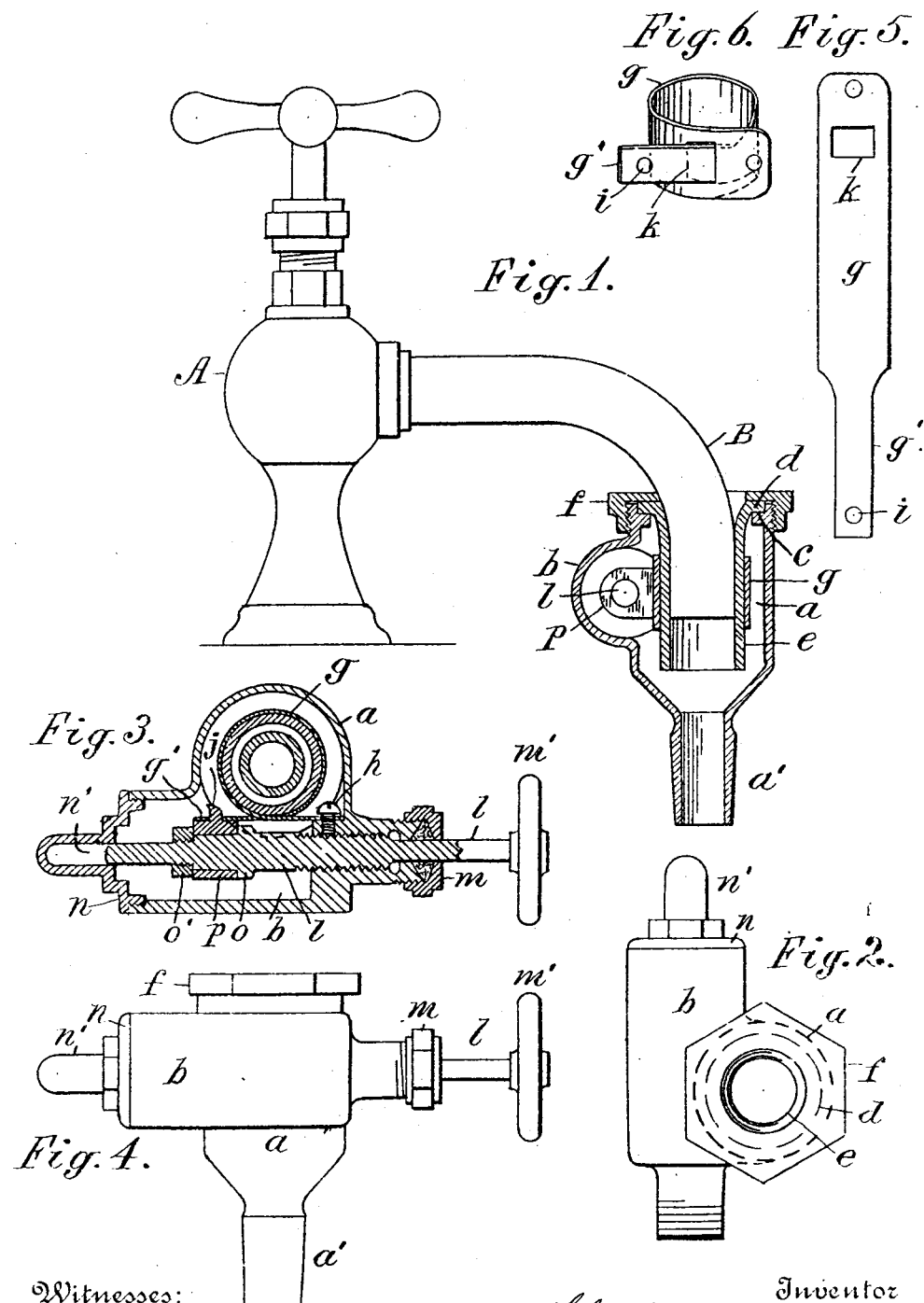

CHARLES H. SHEPHERD, OF NEW YORK, N. Y.

FAUCET HOSE CONNECTION.

1,036,015.  Specification of Letters Patent.  Patented Aug. 20, 1912.

Application filed August 21, 1911. Serial No. 645,266.

*To all whom it may concern:*

Be it known that I, CHARLES H. SHEPHERD, a citizen of the United States, residing at 343 West Twenty-third street, New York, county of New York, and State of New York, have invented certain new and useful Improvements in Faucet Hose Connections, fully described and represented in the following specification and the accompanying drawings, forming a part of the same.

The object of this invention is to furnish a means for readily attaching and detaching a hose to the nozzle of a faucet, bib or basin-cock which is unprovided with any screwthread for connecting a hose coupling, and the invention comprises a casing provided with means for connecting a hose thereto, and having a compressible sleeve secured therein with means for contracting it to clamp the faucet-nozzle and make a water-tight connection thereto.

The invention will be understood by reference to the annexed drawing, in which—

Figure 1 is an elevation of a basin-cock or faucet with a cross section of the hose thereon; Fig. 2 is a plan of the faucet connection; Fig. 3 is a horizontal section through the center of the spindle 1; Fig. 4 is an elevation of the faucet hose connection viewed from the left side of Fig. 1; Fig. 5 is a plan of the clamping strap, and Fig. 6 a perspective view of the same arranged for operation.

A represents a basin-cock with nozzle B to which the hose connection is shown applied in Fig. 1. The connection has a vertical chamber $a$ and a horizontal chamber $b$, the former having an annular recess $c$ in the top in which the flange $d$ of a compressible or contractible sleeve $e$ is fitted and clamped tightly by a screw-collar $f$. The lower end of the chamber $a$ is provided with a tapering snout or outlet $a'$ in line with the bore of the sleeve $e$, and upon which a hose of suitable size may be readily slipped. The casing may be provided with any suitable hose connection at this point instead of the tapering snout. A metallic strap $g$, $g'$, encircles the sleeve, as shown in Fig. 3, and one end $g$ secured within the chamber $a$ by a bolt or other fastening $h$, and the other end having a perforation $i$ to fit upon a stud $j$ which is projected from a block $p$ movable in the chamber $b$. The portion $g'$ is narrower than the portion $g$ of the strap, and a transverse slot $k$ is formed through the portion $g$ near its end through which the narrower portion or tongue $g'$ can be slipped, as shown in Fig. 6, by which construction the forcing of the stud $j$ away from the screw $h$ contracts the strap and the sleeve $e$ which it encircles. Owing to the slipping of one part of the strap through the other, I have, for convenience, termed this device a telescoping strap. To thus move the stud, a screw-spindle $l$ is extended through one end of the chamber $b$ and provided with a stuffing-box $m$, and a removable cap $n$ is applied to the opposite end of the chamber and provided with a guide-socket $n'$ for the adjacent end of the spindle. The block is secured upon the spindle between a collar $o$ and a nut $o'$, so that the spindle may be turned to advance the block without causing any rotary motion of the block. The block thus provides a swivel engagement of the spindle with the strap.

In applying this fixture to the nozzle of a faucet, the screw-spindle by means of its hand-wheel $m'$ is turned to slacken the strap, and the nozzle is then forced within the sleeve and the motion of the spindle reversed to tighten the strap upon the sleeve. The sleeve thus makes a watertight fit upon the nozzle, and as it is clamped to the top of the chamber $a$ by a water-tight joint, the union of the nozzle with the hose connection is made in a most effective manner and almost instantaneously. The water has access to both the chambers, but the horizontal chamber is tightly closed at one end by the cap $n$, and at the opposite end by the stuffing-box $m$.

Having thus set forth the nature of the invention what is claimed herein is:

1. A faucet hose connection, comprising a casing with an annular recess at the top, a compressible sleeve with flange fitted to such recess, a collar screwed upon the casing to clamp the flange, a strap embracing the sleeve and having one end secured within the casing, a screw spindle with a swivel engagement to the other end of the strap, and the casing having means for attaching a hose thereto.

2. A faucet hose connection, comprising a casing with vertical and horizontal chambers, the former having at the bottom means to attach a hose and at the top an annular recess, a compressible sleeve with flange clamped in said recess, a telescoping strap embracing the sleeve with one end secured in said chamber, and the horizontal chamber having a screw-spindle movable therein with means to engage the free end of the strap.

3. A faucet hose connection, comprising a casing with vertical and horizontal chambers, the former having at the bottom means to attach a hose and at the top an annular recess, a compressible sleeve with flange clamped in said recess, a telescoping strap embracing the sleeve with one end secured in said chamber, the horizontal chamber having a screw-spindle extended through one end and having a block swiveled thereon with means to engage the free end of the strap, and a stuffing-box upon the spindle.

4. A faucet hose connection, comprising a casing with vertical and horizontal chambers, the former having at the bottom means to attach a hose and at the top an annular recess, a compressible sleeve with flange clamped in said recess, a telescoping strap embracing the sleeve with one end secured in said chamber, the horizontal chamber having a screw-spindle extended through one end, and a removable cap closing the opposite end and having a guide for the spindle, a block swiveled upon the spindle, and a stud upon the block engaging the free end of the strap.

In testimony whereof I have hereunto set my hand in the presence of two subscribing witnesses.

CHARLES H. SHEPHERD.

Witnesses:
 CARSON G. ARCHIBALD,
 THOMAS S. CRANE.